United States Patent [19]
Roe et al.

[11] Patent Number: 5,226,689
[45] Date of Patent: Jul. 13, 1993

[54] COLLAPSIBLE PORTABLE TENT APPARATUS FOR TAILGATE-TYPE VEHICLES

[76] Inventors: Richard P. Roe; Paulina E. Roe, both of 8228 S. Jasmine Ct., Englewood, Colo. 80112

[21] Appl. No.: 866,143

[22] Filed: Apr. 9, 1992

[51] Int. Cl.⁵ .............................................. B60P 3/34
[52] U.S. Cl. ...................................... 296/159; 296/26
[58] Field of Search ............... 296/159, 161, 163, 26; 135/88, 89

[56] References Cited

U.S. PATENT DOCUMENTS

| | | | |
|---|---|---|---|
| Re. 29,264 | 6/1977 | Woodward | 296/159 |
| 3,348,874 | 10/1967 | Gorman | 296/159 |
| 3,479,079 | 11/1969 | Coursalt | 296/26 |
| 4,065,166 | 12/1977 | Shoemaker | 296/159 |
| 4,192,543 | 3/1980 | Crawford | 296/159 |
| 4,221,425 | 9/1980 | Welle et al. | 296/163 |
| 4,310,194 | 1/1982 | Biller | 296/159 |
| 4,504,049 | 3/1985 | Straub | 296/165 |
| 4,544,195 | 10/1985 | Gunn | 135/88 |

*Primary Examiner*—Robert R. Song

[57] ABSTRACT

A collapsible, compact, sturdy, portable tent apparatus for extending the inside area of certain vehicles to allow camping or storage inside the vehicle, comprising of tent fabric and a compact tent frame. The tent fabric is weatherproof and is equipped with a waterproof gasket seal, a steeple to promote water drainage off the tent, a spare tire rack seal, a door flap and a mosquito net door flap. The tent frame is lightweight, collapsible and compact for ease of storage, and easily extended and connected for ease of erection.

12 Claims, 6 Drawing Sheets

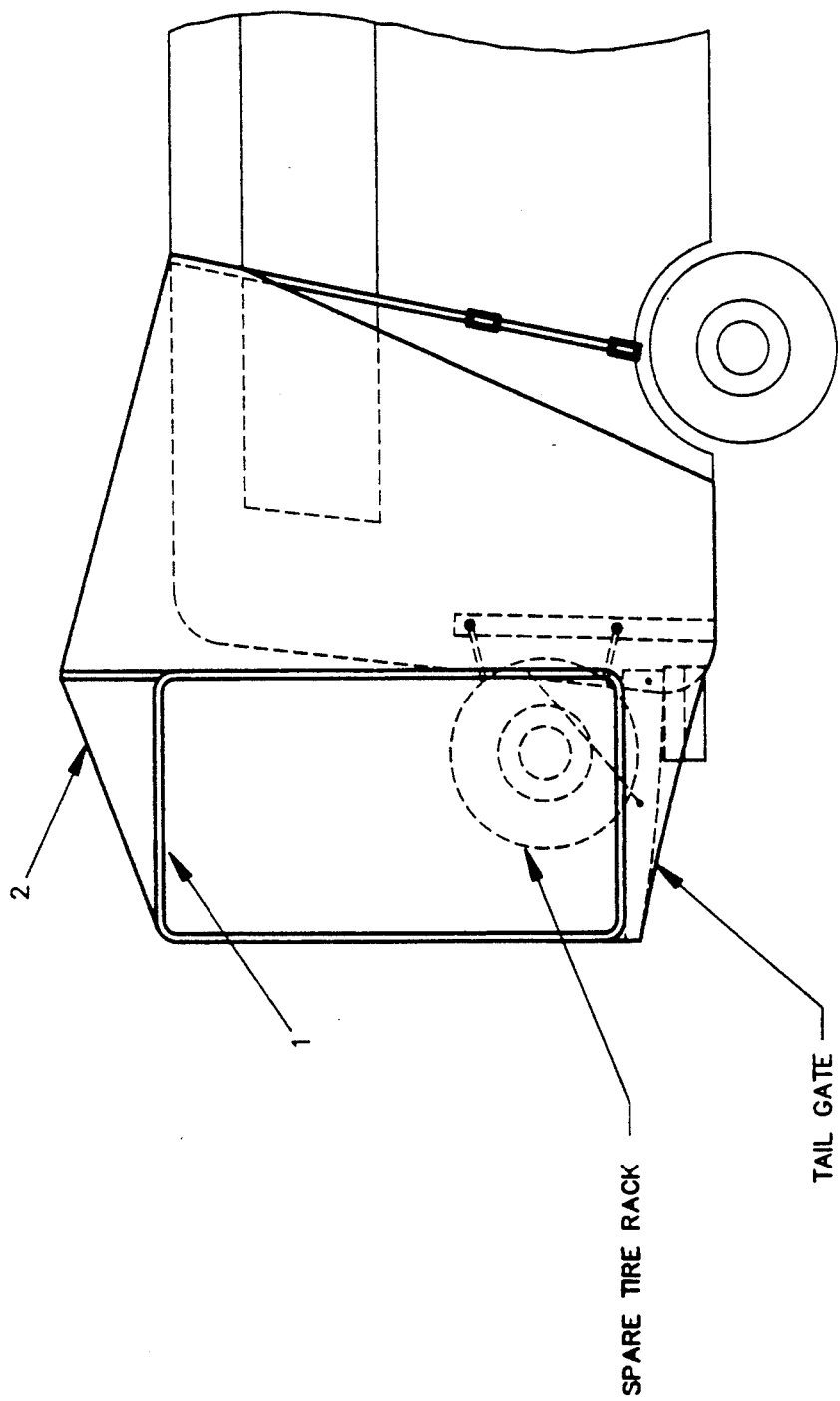

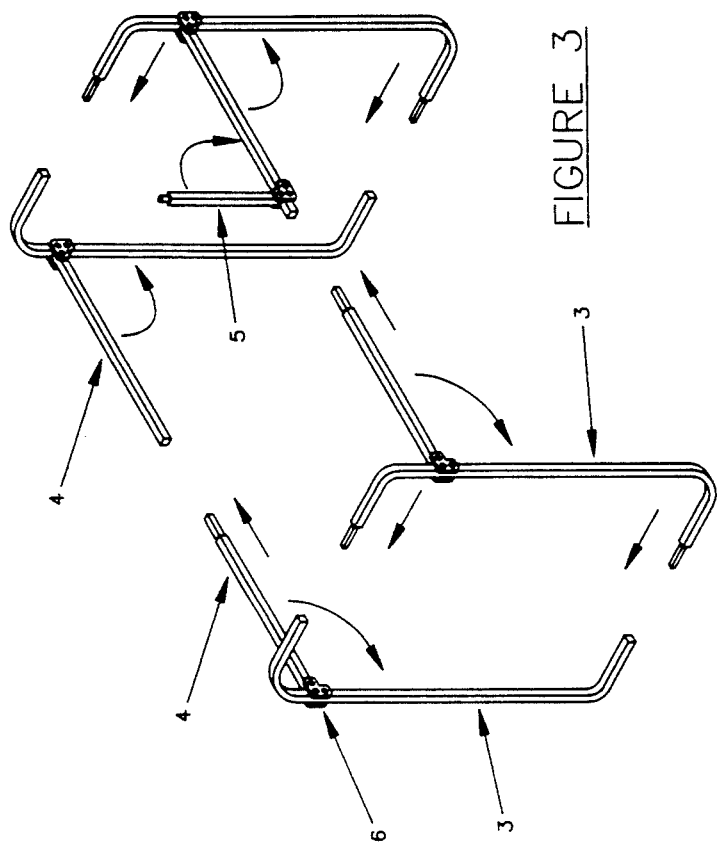
FIGURE 3
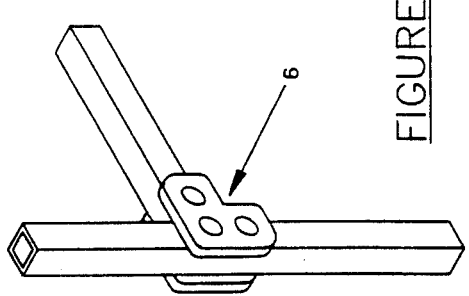
FIGURE 5
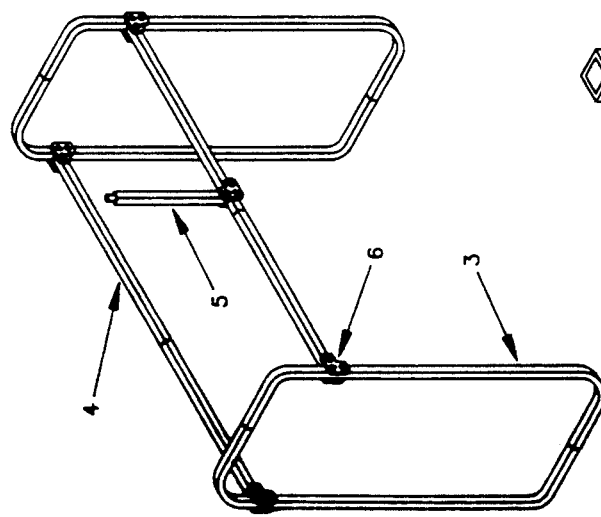
FIGURE 4
FIGURE 2

COLLAPSIBLE PORTABLE TENT APPARATUS FOR TAILGATE-TYPE VEHICLES

BACKGROUND—FIELD OF INVENTION

This invention relates to a tent and frame adapted to the rear end and tailgate of a recreational vehicle with a fold-down tailgate of the variety that have a slide-down window, specifically to an extension of the area in the back of the vehicle to allow camping or other protected storage or living within the enclosed vehicle.

BACKGROUND—DISCUSSION OF PRIOR ART

Camping has always been done in tents erected on the ground, separate and detached from any vehicle. The vehicle had to be unpacked of all camping gear which had to be carried to the tent. Heating within the tent required a separate heating unit. During inclement weather the tent floor often became wet. Erecting the tent was usually a lengthy process, often quite complicated.

Thereafter, inventors have modified the tent to be an extension of a car or of another type of vehicle in various ways such that a tent is still attached to the vehicle to create more room and still keep camp at the vehicle. Some are still based off the ground and some pop out to give more space or headroom. Some have become elaborate extensions which are not easy to erect or easy to transport. Although useful in their own rights, these have basically the following disadvantages:

a) they fit only certain types of vehicles and not the type we are proposing this tent to be used for;

b) they are not easily erected or taken apart;

c) they do not include a collapsible, portable, free-standing frame to rest on the tailgate;

d) they do not appear to provide adequate weatherproofing and water leakage and drainage control.

Heretofore, there have been many tent covers adapted to rear ends of various vehicles. Prior art includes U.S. Pat. No. 4,544,195 issued to Mary M. Gunn on Oct. 1, 1985, U.S. Pat. No. 4,065,166 issued to Brian C. Shoemaker on Dec. 27, 1977, U.S. Pat. No. 4,504,049 issued to Robert P. Straub on Mar. 12, 1985, U.S. Pat. No. Re. 29,264 reissued to Frederick W. Woodward on Jun. 14, 1977, and U.S. Pat. No. 3,479,074 issued to Robert Coursalt on Nov. 18, 1969. None of these prior art references are specifically adaptable to a recreation type vehicle with a folddown tailgate and sliding rear window.

The M. Gunn invention discloses a tent cover over a tailgate but the assembly requires a rear window tiltable upwards to support the tent cover. The B. Shoemaker and R. Straub inventions both disclose assemblies that require rigid extensible floor panels. The F. Woodward invention discloses a tent cover that requires a rear door that opens upwardly. The R. Coursalt invention discloses a frame assemble that attaches on the roof line of a vehicle with a rear door that opens upwardly. None of the prior art references take advantage of a free-standing frame assembly that rests on a tailgate to provide support for a flexible tent cover. In addition, the rubber gasket roof seal and steeple pole of our invention substantially allow for tent cover drainage during severe rain storms. The drainage of rain appears to be a shortcoming of many of the prior art inventions.

Thus far there have been found no tents of the sort as ours which are erected with ease and convenience, are compact, collapsible, sturdy and portable, which fit the recreational-type of vehicle having a fold-down tailgate with a window which slides down into the tailgate, and which account for water drainage in inclement weather conditions.

OBJECTS AND ADVANTAGES

Accordingly, several objects and advantages of this invention are:

a) it is compact and easy to transport;

b) it is quick and easy to erect and to disassemble;

c) the camp tent unit is within the vehicle;

d) the tent has a free standing frame that rests on the tailgate to allow for a tight canopy fit without need for a tilt-up back window for support;

e) tall people can spread out in the back and over the tailgate to sleep comfortably within the camp unit (camp unit meaning vehicle plus attached tent invention);

f) sleeping such allows the camper to sleep off of the ground, which is especially beneficial when weather is poor or ground is wet;

g) there is much more room in the camp unit than in the vehicle alone;

h) the vehicle heater, dome lights, and radio can be used conveniently if needed since the vehicle becomes an integral part of the camp unit;

i) the ease of erecting and disassembling the tent allows for easy changes of camp locations (since all the camping gear can be contained within the vehicle, there is little packing and unpacking to do);

j) in the case of rain, there is a seal pressed against the vehicle roof to protect water runoff into the vehicle interior, and also a raised steeple area of the tent to promote drainage from the top of the tent;

k) the tent is erected while allowing for the presence of the spare tire rack which is attached to the tailgate on some vehicles;

l) the tent opens to the back of the vehicle, with attached mosquito net screen and a door flap which can be propped up to form an awning for a shaded area;

m) the tent stores simply and compactly, reducing unnecessary bulk;

n) when disassembled for storage, the tent measures approximately 45"×20"×10" and weighs approximately 20 pounds;

o) the tent, being very quick and easy to erect, provides a quick shelter in case of a need for camping or simply taking a nap on a long road trip, providing for privacy in the back of the vehicle;

Further objects and advantages of this invention will become apparent from a consideration of the drawings and ensuing description of it.

Drawing Figures

FIG. 1 shows a side view of the rear end of a recreational vehicle with frame assembly resting on the open tailgate and tent cover stretching over the frame and vehicle rear end. The side of the tent cover is a broken view to allow a solid line depiction of the frame assembly.

FIG. 2 is an assembled view of the frame assemble indicating side pieces, top rails, and steeple pole.

FIG. 3 is a segmented view of the frame assembly indicating how the top rails and steeple pole collapse and how the side pieces slide together.

FIG. 4 is a typical detail of the top rail and steeple pole hinge.

FIG. 5 is a typical detail of a top rail and side piece slide coupling.

Figure 8:
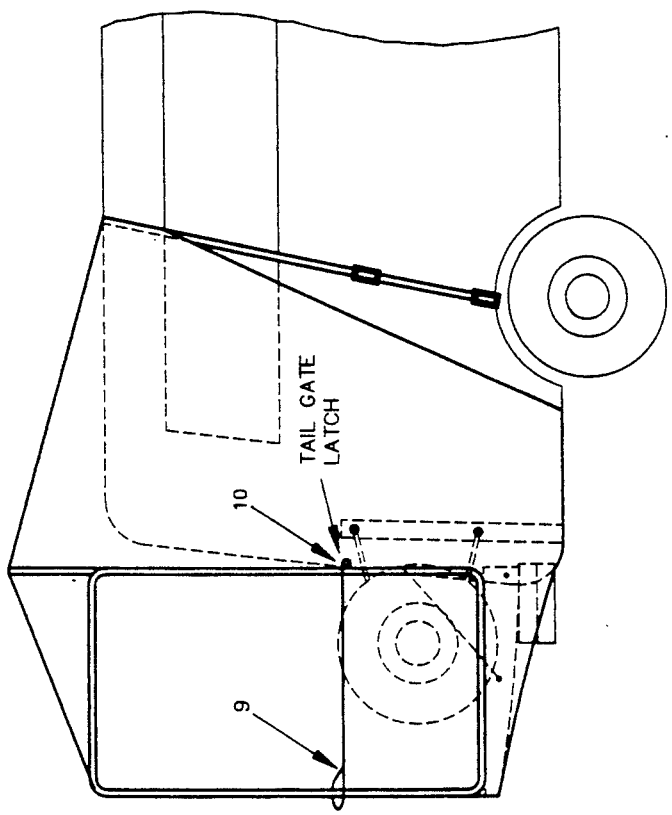
FIG. 8 is a side view of the frame resting on the tailgate and secured with elastic cord and end hook attached to tailgate latch.

REFERENCE NUMERALS IN DRAWINGS (1) Frame Assembly
(2) Tent Cover
(3) Side Piece(s)
(4) Top Rail(s)
(5) Steeple Pole
(6) Hinge(s)
(7) Slide Coupling(s)
(8) Steeple Top Pin
(9) Elastic Cord(s)
(10) End Hook(s)
(11) Outer Rear Door Waterproof Fabric
(12) Inner Rear Door Waterproof Fabric
(13) Outer Rear Door Zipper
(14) Inner Rear Door Zipper
(15) Rear Door Weather Seal
(16) Outer Rear Door Grommet(s)
(17) Tri-Ring(s)
(18) Tie Strap(s)
(19) Roof Panel
(20) Side Panel(s)
(21) Rear Door Panel
(22) Tie Down Strap
(23) Tie Down Cinch Piece
(24) Tie Down Hook
(25) Steeple Pole Grommet
(26) Reinforcement Webbing
(27) Spare Tire Rack Seal
(28) Rubber Gasket Roof Seal
(29) Sunshade Pole(s)
(30) Rope
(31) Stake(s)

DESCRIPTION—FIGS. 1 TO 13

A typical embodiment of the portable collapsible tent apparatus installed on a recreational vehicle is illustrated in FIG. 1. The vehicle is the type with a tailgate that folds down to an open horizontal position. The present invention applies to those type vehicles that have rear windows that retract into the fold-down tailgate. The frame assembly (1) fits conveniently to the size of the tailgate and vehicle rear compartment opening. The tent cover (2) stretches over the frame assembly (1) and vehicle rear end to completely enclose the rear compartment of the vehicle.

The isometric views and details of the frame assembly (1) are shown in FIGS. 2, 3, 4, and 5. The side pieces (3) and top rails (4) fit together at slide couplings (7) to allow for quick installation of the frame assembly (1). The hinge connections (6) allow for the collapsing top rails (4) and steeple pole (5).

Figure 6:
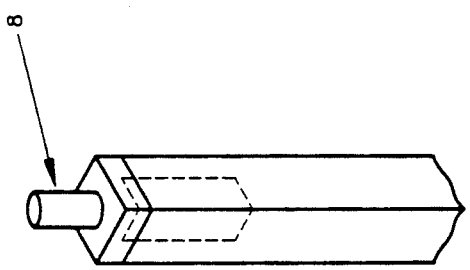
FIG. 6 is a detail of the steeple top pin.
Figure 12:
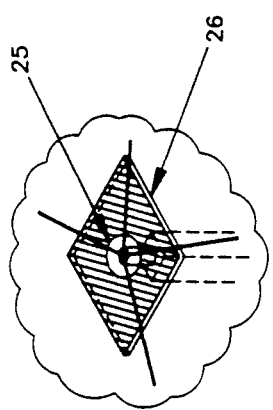
FIG. 12 is a detail of the steeple pole grommet and reinforcement webbing attached to the top panel.

FIGS. 6 and 12 are details of the steeple pole pin (8) and steeple pole grommet (25). The steeple pole grommet (25) is set into a small patch of reinforcement webbing (26). The reinforcement webbing (26) is sewn to the inside of the apex of the tent cover (2). The steeple pole pin slides into the steeple pole grommet (25) which provides a sturdy support for the sloped roof of the tent cover (2).

Figure 7:
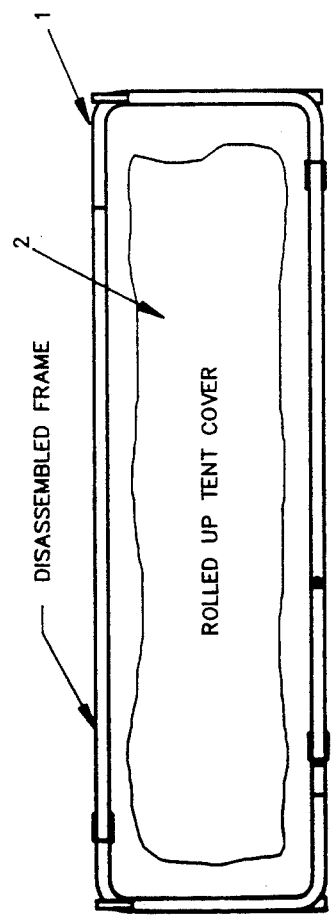
FIG. 7 is a plan view of the disassembled frame and tent cover as rolled up and arranged in a compact package.

FIG. 7 illustrates the compact size of the disassembled frame assembly (1) and rolled up tent cover (2). The compact size facilitates storage, packing and travel.

FIG. 8 illustrates the frame secured to the vehicle rear end with an elastic cord (9) and end hook (10). The end hook (10) is attached to the tailgate latch. There is an elastic cord (9) attached to the side piece (3) and end hook attached to the tailgate latch on both the driver side and passenger side of the vehicle. These elastic cords and end hooks stabilize the frame assembly (1) onto the tailgate.

Figure 9:
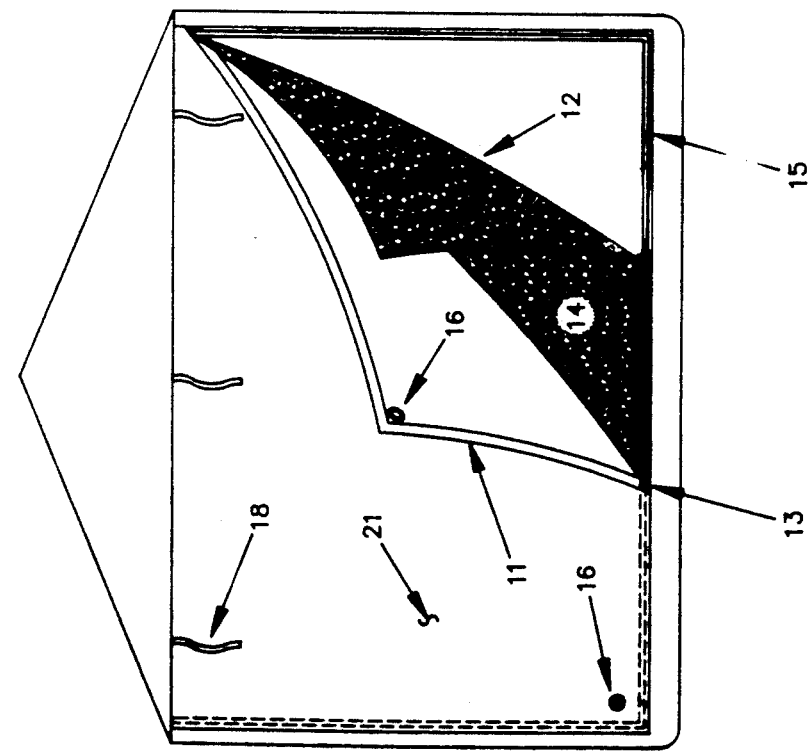
FIG. 9 is a rear end view of the tent cover indicating the outer rear door weatherproof fabric, inner rear door mosquito screen, zippers, rear door weather seal, and outer door grommets.

FIG. 9 illustrates the rear door panel (21) details. There are two layers of door fabric. Weather protection is provided by the outer rear door waterproof fabric (11). A synthetic fuzzy sided fabric is attached along the periphery of the outer rear door weatherproof fabric (11). A mating synthetic hook material strip is attached to the opposing edge of the tent cover to provide a rear door weather seal (15). The inner rear door mosquito screen (12) keeps insects out. Each rear door has a separate zipper (13) and (14), continuous on three sides. The doors can be rolled up and tied in place with the tie straps (18) at the top of the door panel. Leaving the outer door rolled up and the inner door closed and zipped allows air flow into the vehicle rear compartment while keeping insects out. The outer rear door grommets (16) can be used to tie the outer rear door horizontally to provide a sun shade/awning (refer to FIG. 14 below).

Figure 10:
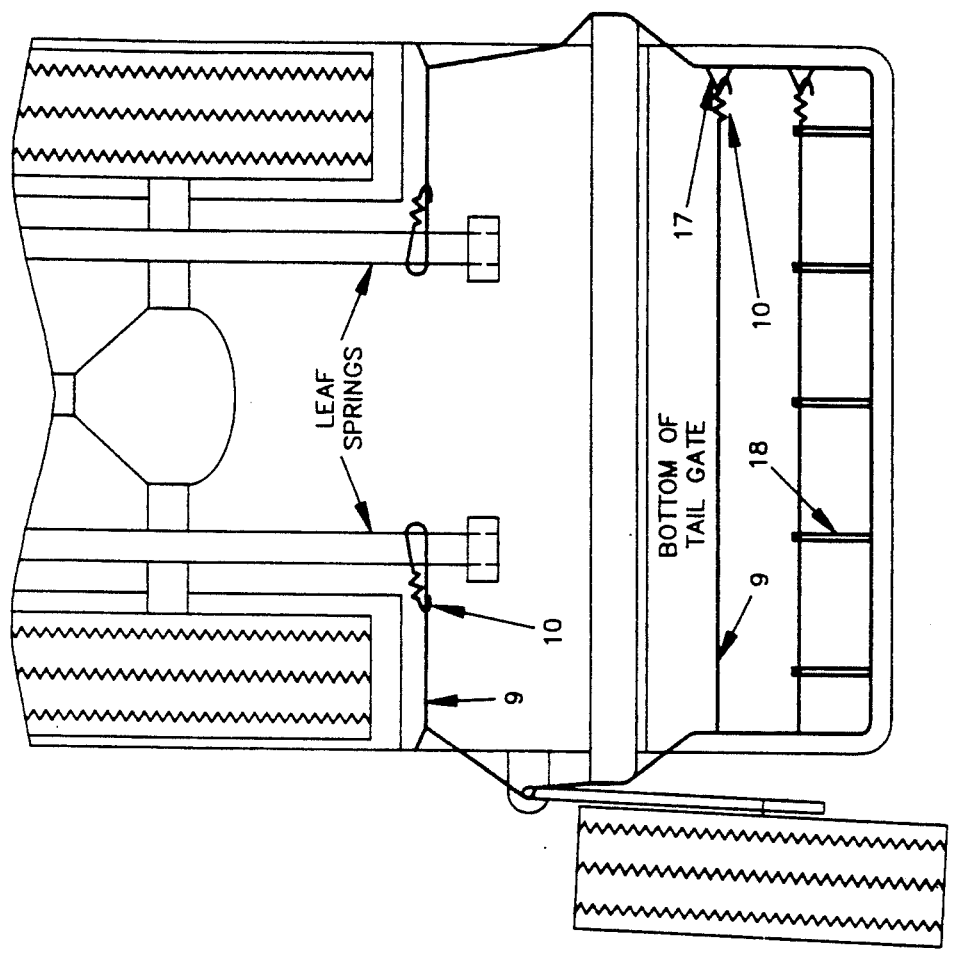
FIG. 10 is a plan view of the tent cover stretched over the frame assembly indicating the top panel, side panel, rear door panel, tie down strap, tie down strap cinch piece, and tie down strap end hook.

FIG. 10 illustrates the attachments of the tent cover to the undercarriage of the vehicle. Elastic cords (9) are used to provide tension in the tent cover (2). Elastic cords (9) and end hooks (10) are attached around the vehicle leaf springs. Elastic cords (9) are stretched under the tailgate from driver side to passenger side with end hooks (10) terminating at tri-rings (17). Tie straps (18) are attached around the elastic cord (9) that extends across the underside of the tailgate.

Figure 11:
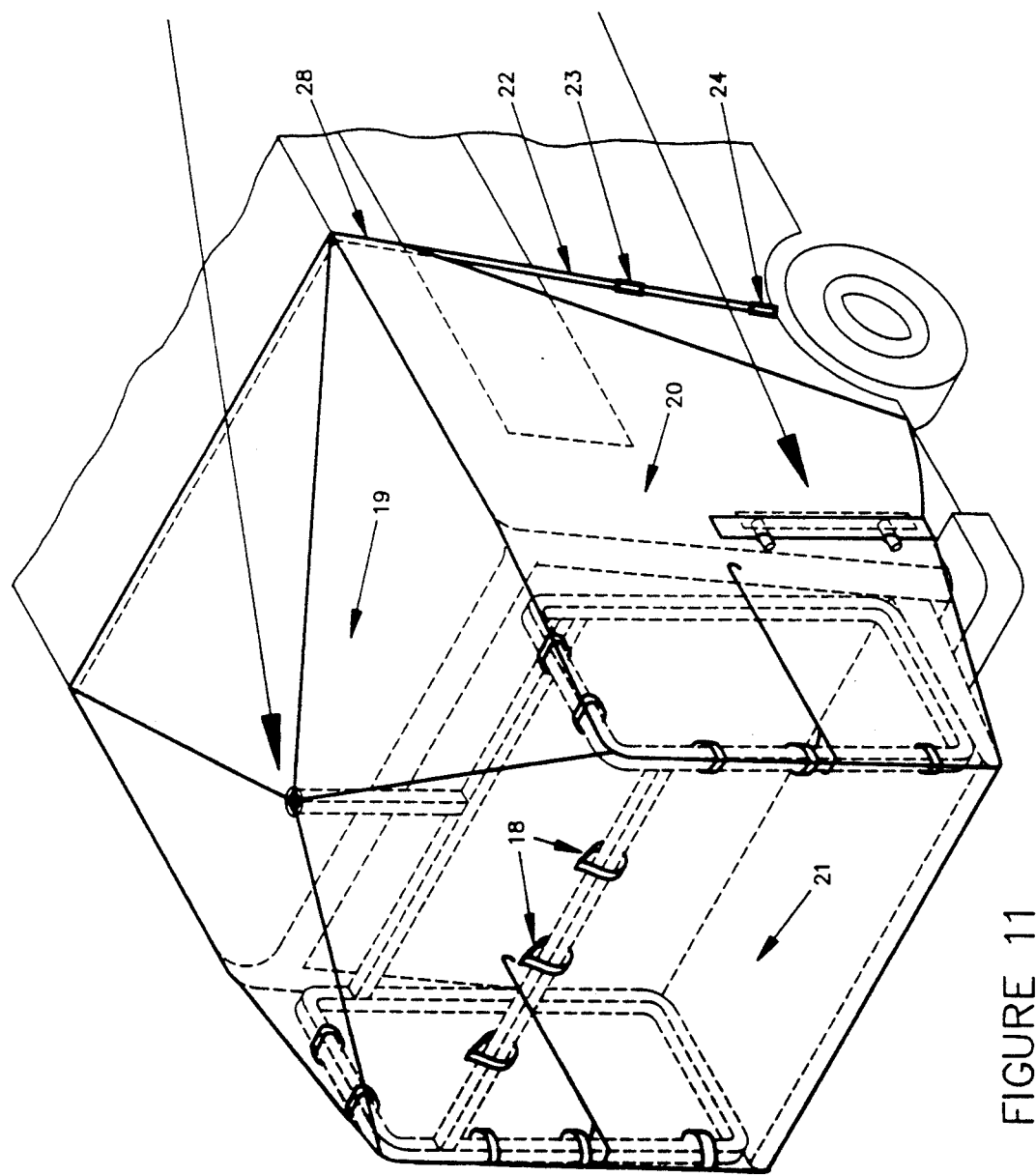
FIG. 11 is an isometric view of the tent cover stretched over the frame assembly indicating the top panel, side panel, rear door panel, tie down strap, tie down strap cinch piece, and tie down strap end hook.

FIG. 11 illustrates the tent cover (2), side panels (20), roof panel (19), and rear door panel (21). Tie straps (18) are used at various points to secure the tent cover (2) to the frame assembly (1). A rubber gasket roof seal (28) is attached to the underside of the front edge of the roof panel (18). Tie down straps (22) are attached to the side panels (20) at the front edge. The tie down straps (22) terminate at tie down hooks (24). The tie down hooks (24) attach under the vehicle rear wheel wells. The tie down cinch pieces (23) allow for adjusting tension in the tie down strap. The tension provided by the tie down straps (22) compress the rubber gasket roof seal

(28) against the vehicle roof, thus forming a rain-tight seal.

Figure 13:
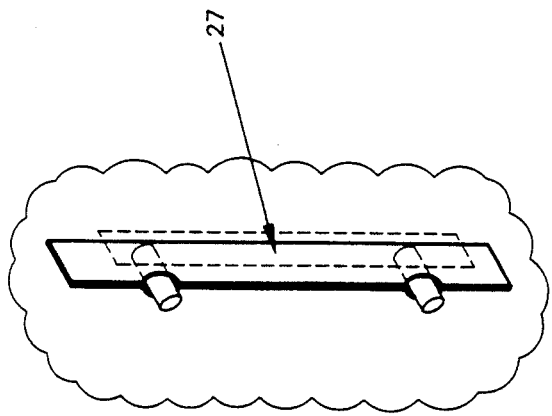
FIG. 13 is a detail of the spare tire rack seal.

FIG. 13 illustrates a detail of the spare tire rack seal (27). The spare tire rack seal is constructed of a synthetic fuzzy fabric that adheres to a mating hook fabric piece when pressed together. If there is no spare tire rack on the vehicle, this seal need not be opened for use.

Figure 14:
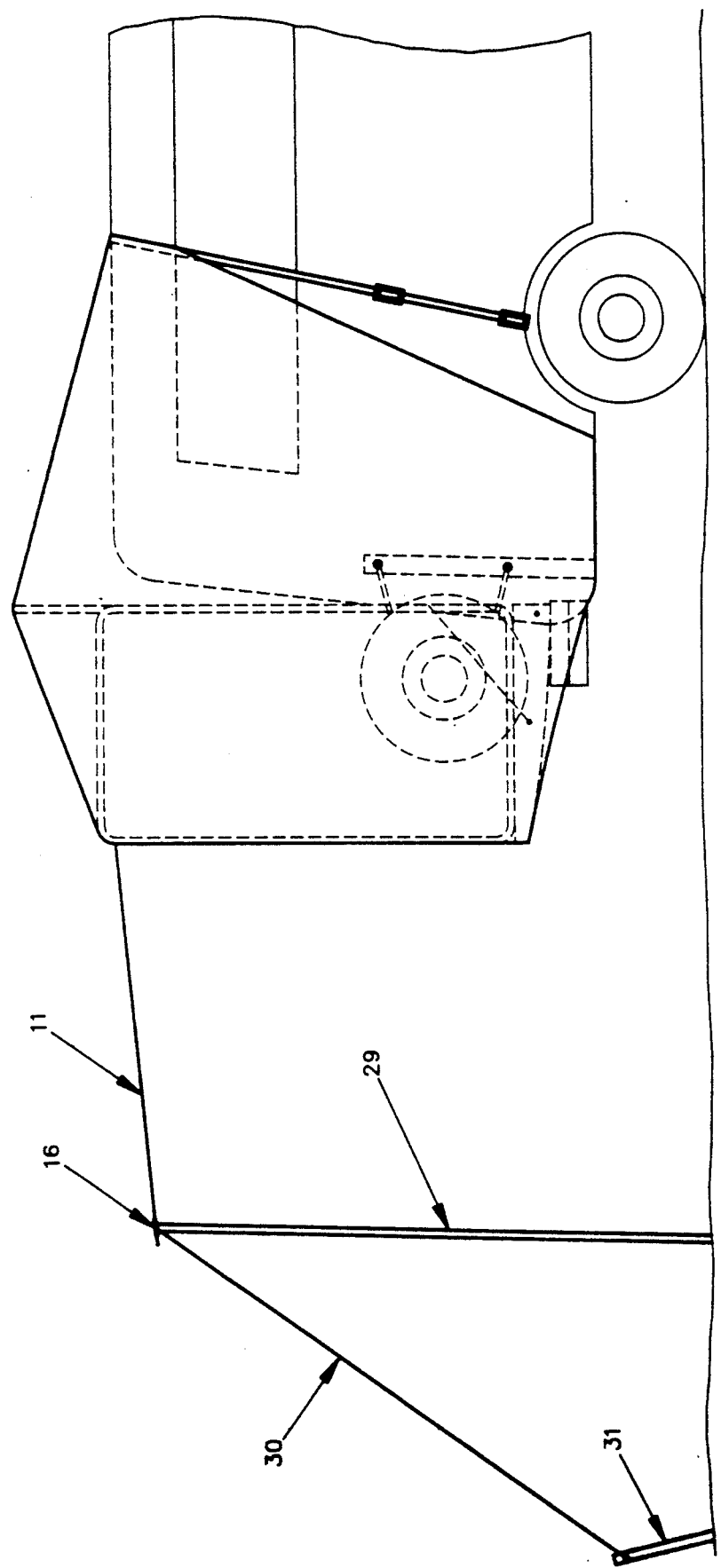
FIG. 14 is a side view of the vehicle with the outer rear door extended and propped up for a sunshade.

FIG. 14 illustrates the sunshade feature of the tent assembly. The sunshade poles (29) support the outer rear door waterproof fabric (11), when extended horizontally and attached to outer rear door grommets (16). Ropes (30) and stakes (31) provide tension necessary to hold poles (29) in a vertical position.

SUMMARY, RAMIFICATIONS, AND SCOPE

Accordingly, the reader will see that this invention is convenient, compact, sturdy, simple to use, and offers features that make camping comfortable, off the ground, and protected from the elements. Although the description above contains many specifications, these should not be construed as limiting the scope of the invention but as merely providing illustrations of some of the presently preferred embodiments of this invention; other variations are possible, such as the frame assembly does not necessarily need to be of square tubing or of the arrangement depicted. Also the tent canopy could be made of a rigid shell material rather than a waterproof fabric. In addition, details of the rear door panel and spare tire rack may be modified or eliminated, as enhancements to the current design. Thus the scope of the invention should be determined by the appended claims and their legal equivalents, rather than by the examples given.

We claim:

1. A collapsible portable tent apparatus for use on a recreational vehicle of the type with a rear tailgate and rear sliding glass window retractable into said tailgate hinged directly above the bumper to pivot from an upright closed position downward to a horizontal open position comprising:
   a means for extending enclosed space in back end of said vehicle when parked, with said tailgate in said open position,
   said means including a tent cover enshrouding back end of said vehicle,
   a frame assembly of rigid support for said tent cover,
   said means further including means for securing said frame assembly to said tailgate, attaching said tent cover to said frame assembly, and sealing said tent cover to roof, side panels, and edge surfaces of said tailgate of said vehicle.

2. The collapsible portable tent apparatus of claim 1 wherein said frame assembly includes bent square tubing side pieces and front and rear top rails connected to form a rectangular box frame of sufficient size to conform to the space outlined by perimeter of said tailgate when in said open position, extending upward to the roof line of said vehicle.

3. The portable collapsible enclosure of claim 1 wherein said frame assembly rests on said tailgate when in said open position, and said frame is secured to said vehicle with elastic cords with end hooks.

4. The collapsible portable tent apparatus of claim 2 wherein said frame assembly includes a steeple pole attached by steeple pole hinge connection at center of said rear top rail and when tilted vertically, said steeple pole extends above said roof line of said vehicle.

5. The collapsible portable tent apparatus of claim 1 wherein said frame assembly is collapsible by disassembly of a plurality of said side pieces and said top rails at slide couplings and collapsing of said top rails and said steeple pole at top rail and steeple pole hinge connections.

6. The collapsible portable tent apparatus of claim 1 wherein said tent cover includes a top panel, two side panels, and a rear door panel.

7. The collapsible portable tent apparatus of claim 6 wherein said top panel and side panels are constructed of weatherproof fabric materials.

8. The collapsible portable tent apparatus of claim 5 wherein a said rear door panel includes an outer rear door weatherproof fabric, inner rear door screen fabric and a plurality of zippers for attaching said rear door panel to said side panels thereby allowing manual opening and closing of said rear door panel.

9. The collapsible portable tent apparatus of claim 1 wherein said securing means includes a rubber gasket roof seal attached to front top edge of said tent cover, a plurality of adjustable tie down straps, one end of each of said tie down straps attached to front side portions of said tent cover and the other end thereof having a hook for attachment under wheel well of said vehicle, a plurality of elastic cords attached to rear bottom portions of said tent cover, said elastic cords having hooks attached to free ends thereof for attachment to undercarriage of said vehicle, and a plurality of tie straps for securing tent cover to frame assembly.

10. The collapsible portable tent apparatus of claim 1 wherein said tent cover includes a spare tire rack seal assembly to provide enclosure around spare tire rack, if applicable, of said vehicle.

11. The collapsible portable tent apparatus of claim 4 wherein said outer rear door weatherproof fabric may be manually opened and horizontally extended and tied in place with use of outer rear door grommets to provide an awning for shade, with use of poles.

12. The collapsible portable tent apparatus of claim 8 wherein said outer rear door fabric and inner rear door mosquito screen may be manually rolled up and attached near roof line with tie straps thus allowing access into vehicle from rear end.

* * * * *